United States Patent
Vermeulen

[11] Patent Number: 6,022,057
[45] Date of Patent: *Feb. 8, 2000

[54] CAR CRASH PROTECTOR

[75] Inventor: Jan Willem Vermeulen, Beekbergen, Netherlands

[73] Assignee: Kelowna Hectares B.V., Bwwkbergen, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/776,043
[22] PCT Filed: Jul. 17, 1995
[86] PCT No.: PCT/NL95/00250
  § 371 Date: Mar. 14, 1997
  § 102(e) Date: Mar. 14, 1997
[87] PCT Pub. No.: WO96/02406
  PCT Pub. Date: Feb. 1, 1996

[30]  Foreign Application Priority Data

Jul. 18, 1994 [NL] Netherlands ............... 9401181

[51] Int. Cl.$^7$ ............... B60R 19/26; B60R 19/28
[52] U.S. Cl. ............... 293/132; 293/137; 293/142; 293/145; 293/146
[58] Field of Search ............... 293/120, 121, 293/122, 132, 133, 137, 142, 143, 144, 145, 146

[56]  References Cited

U.S. PATENT DOCUMENTS 3,827,741  8/1974  Howell et al. ............... 293/122
4,944,540  7/1990  Mansoor et al. ............... 293/115
5,566,777  10/1996  Trommer et al. ............... 293/133 X

FOREIGN PATENT DOCUMENTS 2550019    5/1977   Germany .
3020997    2/1982   Germany .
9105739    8/1991   Germany .
9306545   11/1993   Germany .
60-209344 10/1985   Japan .
91/01904   2/1991   WIPO .

OTHER PUBLICATIONS

Patent Abstracts of Japan, vol. 10, No. 62 (M–460) [2119], Mar. 12, 1986 of JP, A, 60 209344 (NISSAN) Oct. 21, 1985.

*Primary Examiner*—D. Glenn Dayoan
*Assistant Examiner*—Patricia Engle
*Attorney, Agent, or Firm*—Webb Ziesenheim Logsdon Orkin & Hanson, P.C.

[57]  ABSTRACT

A device for fixing to the front part of a vehicle, comprises a support construction which is assembled from profile parts manufactured from metal plate material and provided with attachment points for fixing thereof to the vehicle, a plastic cover element for separately covering the sides of each profile part facing away from the vehicle, and connecting members connecting the cover element to the support construction, wherein between the profile parts of the support construction and the cover element free spaces are present and the cover element is manufactured from deformable plastic.

10 Claims, 3 Drawing Sheets

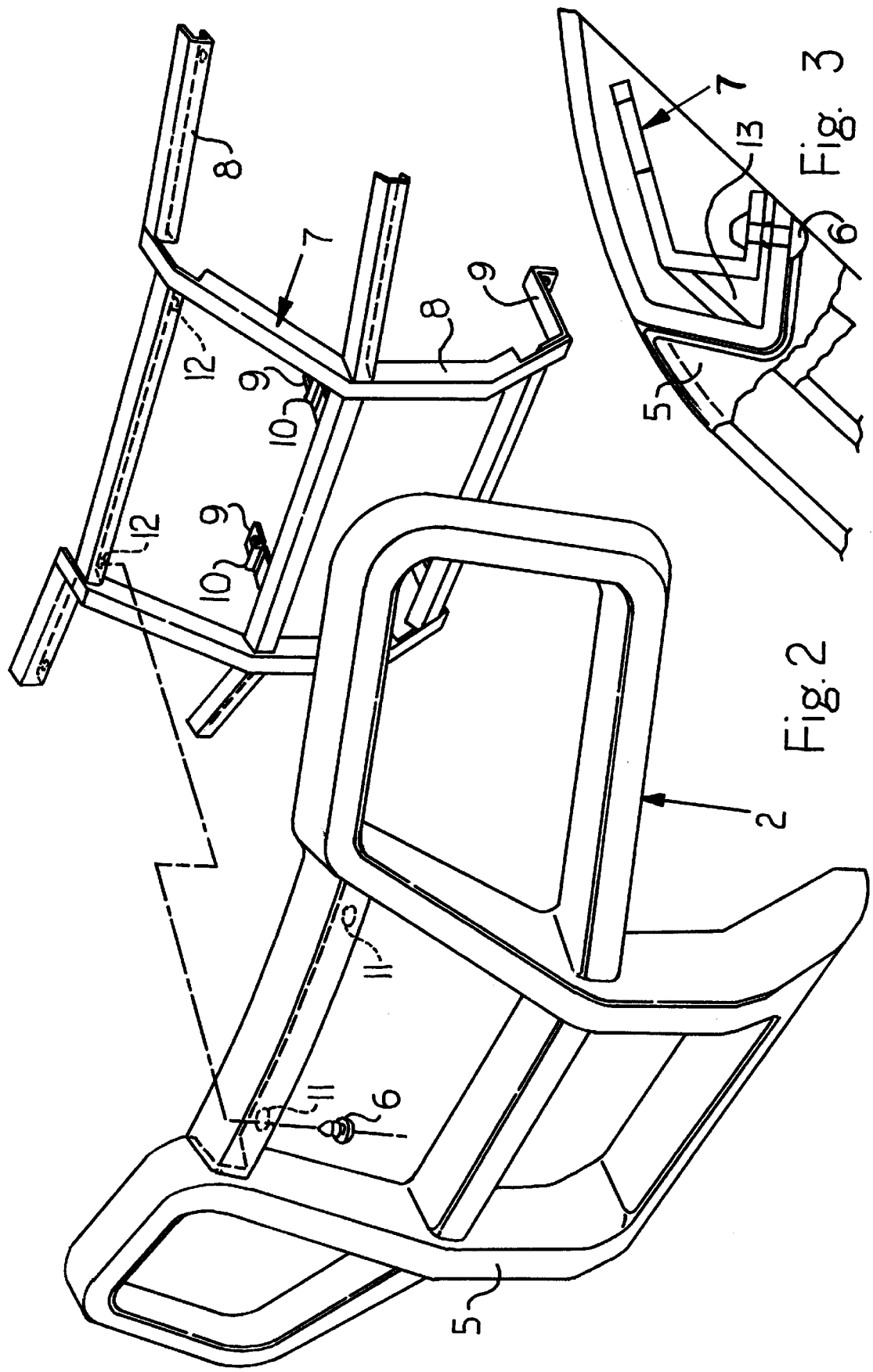

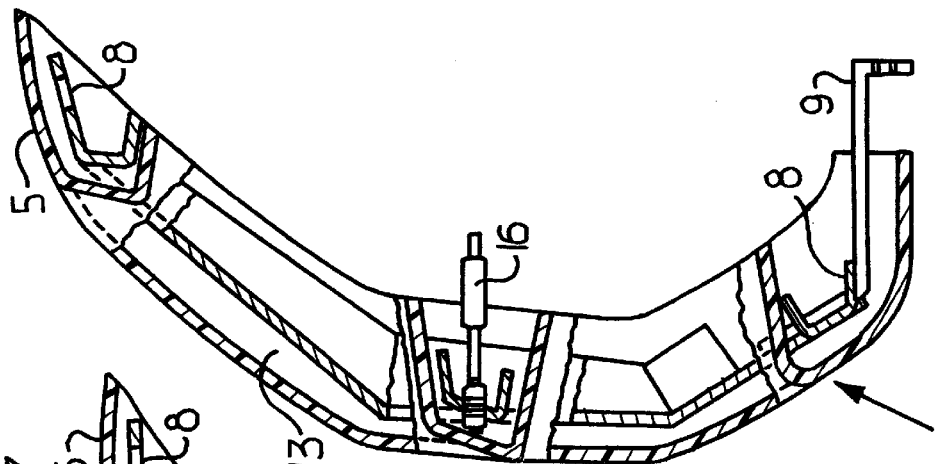
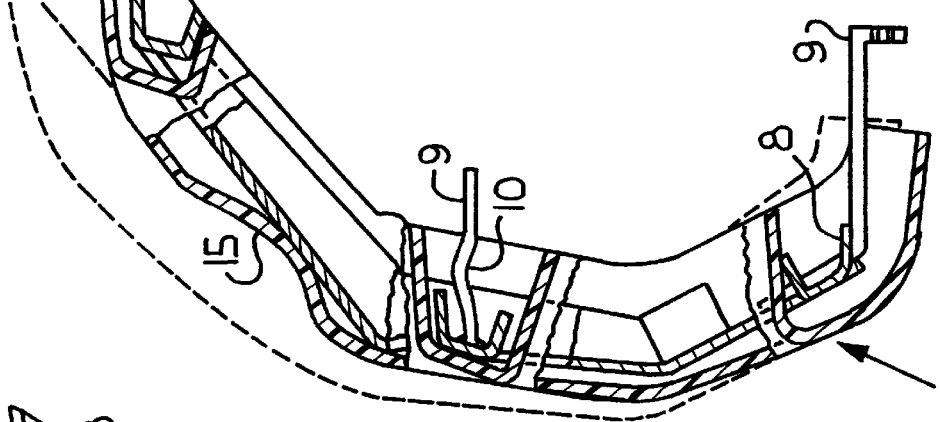
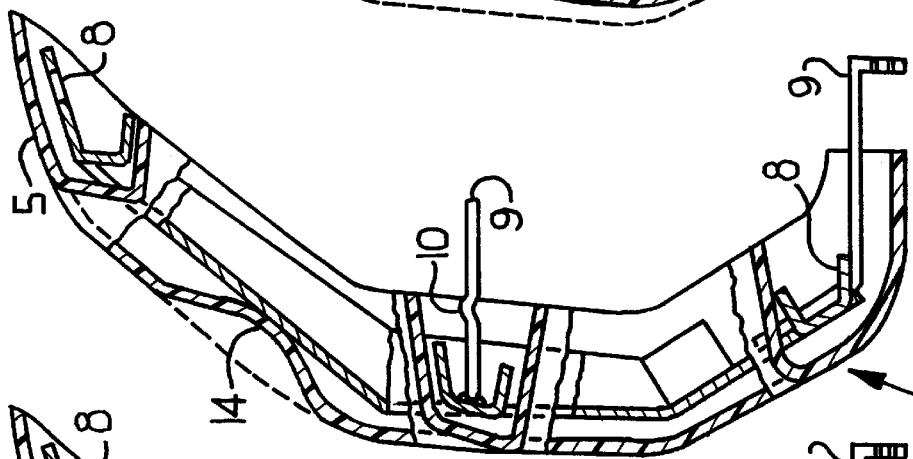
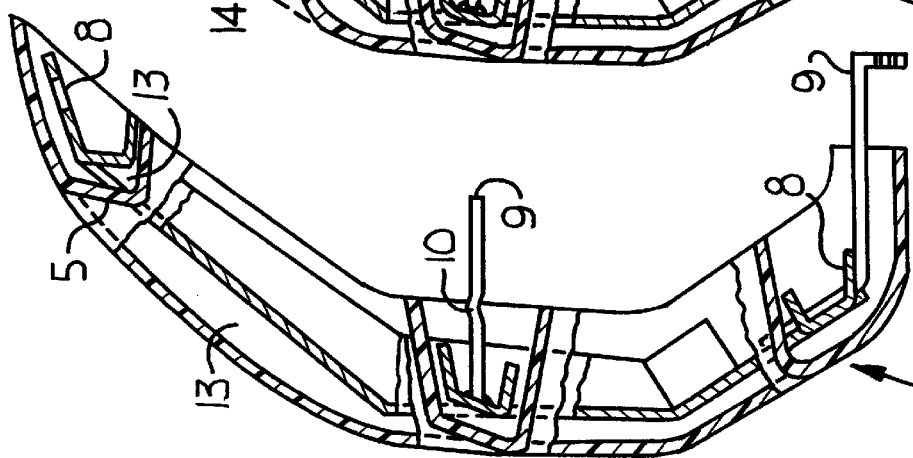

CAR CRASH PROTECTOR

BACKGROUND OF THE INVENTION

1. Field of the Invention

The invention relates to a device for fixing to the front part of a vehicle.

2. Description of the Prior Art

Existing constructions for fixing to the front side of a vehicle usually consist of a grid structure or bar assembly to protect the front part of the vehicle. The construction must protect the vehicle against for example wildlife, stray cattle, branches etc, and is generally attached to cross-country vehicles or types of vehicles derived therefrom.

Such a construction is a functionally superfluous attribute for vehicles on the public highway but contributes to a particular image of the vehicle to which it is fixed. Many "cross-country vehicles" are only used in an environment where a car crash protector is functionally superfluous, but wherein a car crash protector is indispensable to the image of the vehicle. For fellow road-users (for instance pedestrians or cyclists) the danger of serious injury is increased in the case of a collision with such a "cross-country vehicle".

SUMMARY OF THE INVENTION

The object of the present invention is to manufacture a construction for fixing to the front part of a vehicle, without adversely affecting the appearance of the construction, such that the danger of "serious" injury to fellow road-users is limited.

The invention provides to this end a device for fixing to the front part of a vehicle comprising a support construction which is assembled from profile parts manufactured from metal plate material and provided with attachment points for fixing thereof to the vehicle, a plastic cover element for separately covering the sides of each profile part facing away from the vehicle and means for connecting the cover element to the support construction, wherein between the profile parts of the support construction and the cover element free spaces are present and the cover element is manufactured from deformable plastic.

The free spaces are preferably located on the side of the profile parts located at the greatest distance from the vehicle.

The thus manufactured construction has a robust appearance but is also capable of absorbing energy during a collision. In the case of a light collision only the plastic cover element of the construction will deform. After the collision the cover element will then be able to reassume its original form. In the case of a heavier collision not only the plastic cover element deforms but the support construction manufactured from metal plate material also deforms. This deformation is permanent but absorbs a relatively large amount of energy, whereby an object involved in the collision (for instance a fellow road-user) will be less badly damaged.

The support construction is preferably connected to the vehicle with interposing of at least one element absorbing energy during deformation. In a preferred embodiment the energy-absorbing element is formed by a deformable mounting bracket. In another preferred embodiment the energy-absorbing element is a spring. The energy-absorbing elements increase the total capacity of the energy-absorbing power of the construction. This enhances the above stated advantages.

The parts of the cover element located closest to the sides of the vehicle preferably project over the support construction. The cover element is hereby not supported on the sides by the support construction, whereby they will fold over in the case of a collision.

BRIEF DESCRIPTION OF THE DRAWINGS

Further details and advantages of the invention will become apparent from the following detailed description in conjunction with the drawings wherein like reference numerals are designated by primed reference numerals to designate like parts.

The invention is further elucidated with reference to the non-limitative embodiments shown in the following figures. Herein:

FIG. 2 is a perspective view of a car crash protector disassembled into parts, FIG. 3 is a cross section along section line III—III in FIG. 1 through a part of the car crash protector in the assembled situation, FIG. 4 is a cross section through the car crash protector in the assembled, non-deformed situation, FIG. 5 is a cross section through the car crash protector as according to FIG. 4 in temporarily deformed situation, FIG. 6 is a cross section through the car crash protector as according to FIG. 4 and 5 in permanently deformed situation, and FIG. 7 shows a cross section through an alternatively embodied car crash protector.

DETAILED DESCRIPTION OF THE PREFERRED EMBODIMENTS

Figure 1:
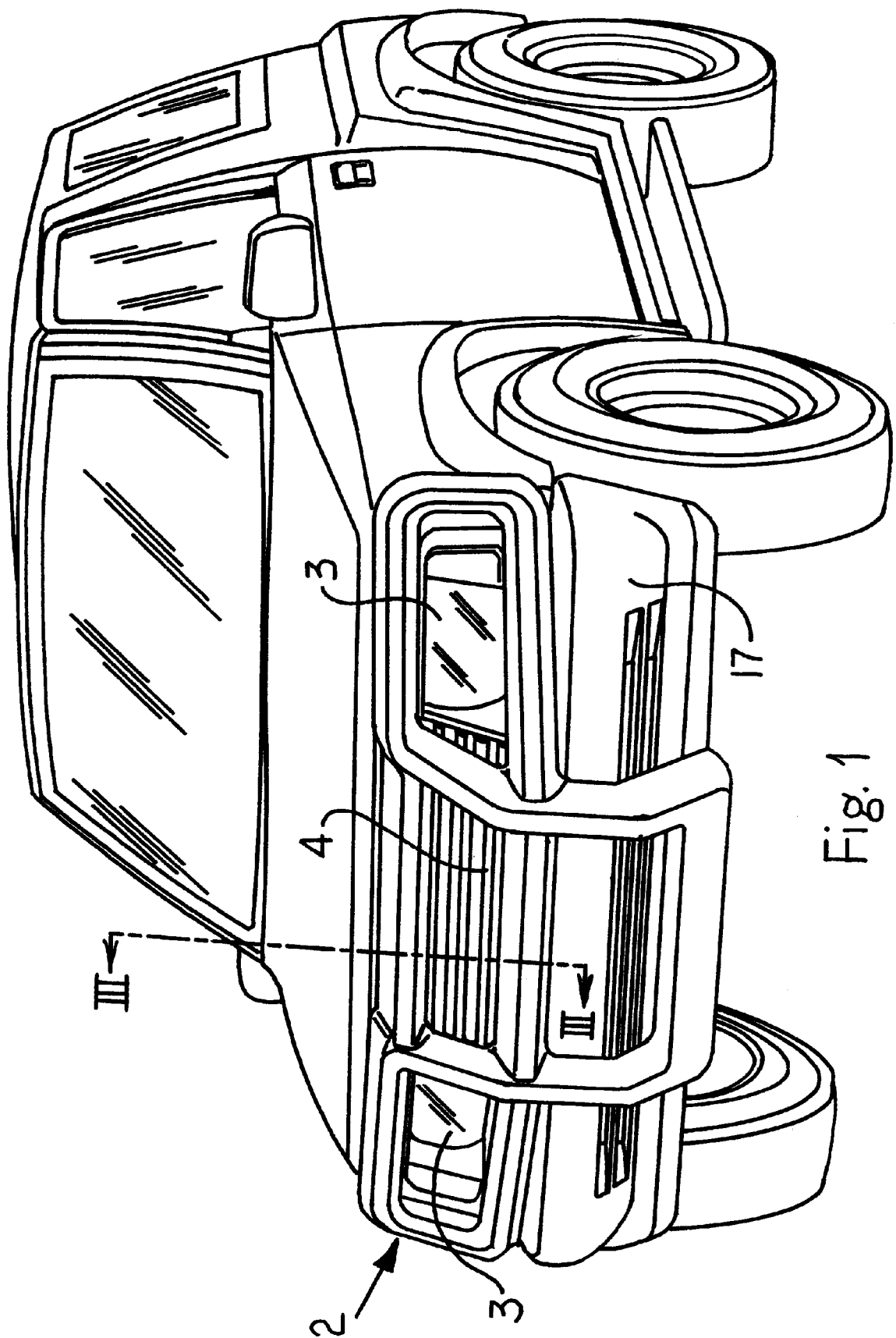
FIG. 1 shows a perspective view of a vehicle provided with a car crash protector according to the invention.

FIG. 1 shows a vehicle 1, to the front side of which is fixed a car crash protector 2. Car crash protector 2 is fixed such that it leaves free the headlights 3 and the feed grill 4 for cooling air and partially covers a bumper 17 of the vehicle 1. The car crash protector 2 provides vehicle 1 with a robust appearance.

FIG. 2 shows the car crash protector 2 in disassembled parts. A cover element 5 manufactured from deformable plastic can be connected to a metal support construction 7 using connecting members 6. The support construction 7 is built up of profile parts 8 made of relatively thin plate material. Support construction 7 can be fixed to the vehicle 1 (not shown here) using coupling elements 9 which support the support construction 7 in a vertical direction as shown in FIGS. 3–7. The upper two coupling elements 9 shown here are provided with a weakened portion 10, whereby they are deformable. In the cover element 5 and the support construction 7 are arranged respective recesses 11, 12 for insertion of the connecting members 6.

FIG. 3 shows in cross section a part of the car crash protector 2 in assembled state. Shown clearly is a free space 13 which is situated on the front side between the cover element 5 and the support construction 7.

FIG. 4 shows a cross section of the car crash protector 2 of the foregoing figures in an unloaded and undeformed state. In FIG. 5 the same cross section is shown during a light collision. The plastic cover element 5 thereby receives a dent 14 which is situated in the space 13 which originally existed between cover element 5 and support construction 7. The plastic cover element 5 can be embodied such that a small dent 14 disappears again after a collision because the deformed material springs back to the original shape (see FIG. 4). Energy released during the collision is herein absorbed by the deforming of cover element 5; the risk of injury to fellow road-users or damage to other objects is hereby limited. Subsequently shown in FIG. 6 is the situation during a heavy collision. Not only the cover element 5 but also the support construction 7 and the upper coupling elements 9 are hereby deformed. The cover element 5 is not capable of absorbing by means of a dent 15 all the energy released during the collision. The remaining energy will then be absorbed to an at least significant degree by the deformation of the support construction 7. The plate material of which the profile parts 8 of support construction 7 are made intentionally have a limited sturdiness so that this generally permanent deformation becomes possible. Safety is hereby further enhanced, since all energy absorbed by the car crash protector 2 cannot damage a fellow road-user or other object. Finally, the upper coupling elements 9 will also deform close to the arranged weakened portions 10 so that again a part of the energy is also hereby absorbed.

FIG. 7 shows a car crash protector 2', wherein the upper coupling elements are formed by at least one spring 16. The spring 16 is also capable of storing energy. After compression of the spring 16 it can spring back again into the original position. Car crash protector 2' includes a cover element 5', profile parts 8',coupling elements 9' and space 13' similar to car crash protector 2 discussed hereinabove. This perhaps more expensive construction therefore has the advantage that a possible deformation of the mounting of car crash protector 2' to vehicle is only of a temporary nature.

The Invention claimed is:

1. A device for fixing to a front part of a vehicle, the device comprising a support construction which is assembled from profile parts manufactured from metal plate material and provided with attachment points for fixing thereof to the vehicle, a plastic cover element for separately covering sides of each profile part facing away from the vehicle, and means for connecting the cover element to the support construction, wherein between the profile parts of the support construction and the cover element free spaces are present and the cover element is manufactured from deformable plastic, wherein the support construction is fixed to the vehicle with at least one deformable element having a weakened portion with a C-shaped vertical cross section that absorbs energy during deformation, wherein the support construction is supported a fixed distance from the front part of the vehicle by the at least one deformable element, wherein the front part of the vehicle includes headlights, a feed grill and a bumper and the device is fixed to the front part of the vehicle such that the headlights and the feed grill of the vehicle remain uncovered, and wherein the support construction conforms to a shape of the front part of the vehicle and the at least one deformable element functions to absorb energy during a frontal collision involving the vehicle before the bumper of the vehicle is engaged.

2. The device as claimed in claim 1, wherein the free spaces are located on the sides of the profile parts located farthest from the vehicle.

3. The device as claimed in claim 1, wherein the deformable element is a deformable mounting bracket.

4. The device as claimed in claim 1, wherein the deformable element is a spring.

5. The device as claimed in claim 1, wherein the cover element projects over the support construction.

6. The device as claimed in claim 2, wherein the support construction is connected to the vehicle with interposing of the at least one deformable element absorbing energy during deformation.

7. The device as claimed in claim 6, wherein the at least one deformable element is a deformable mounting bracket.

8. The device as claimed in claim 6, wherein the at least one deformable element is a spring.

9. The device as claimed in claim 2, wherein the cover element projects over the support construction.

10. The device as claimed in claim 6, wherein the cover element projects over the support construction.

* * * * *